(12) United States Patent
Lection et al.

(10) Patent No.: US 9,969,325 B2
(45) Date of Patent: May 15, 2018

(54) PROJECTED SURFACE MARKINGS

(71) Applicant: International Business Machines Corporation, Armonk, NY (US)

(72) Inventors: David B. Lection, Raleigh, NC (US); Maharaj Mukherjee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 14/854,408

(22) Filed: Sep. 15, 2015

(65) Prior Publication Data

US 2017/0072843 A1    Mar. 16, 2017

(51) Int. Cl.
*B60Q 1/50*    (2006.01)
*G08G 1/16*    (2006.01)

(52) U.S. Cl.
CPC ........... *B60Q 1/50* (2013.01); *G08G 1/167* (2013.01); *B60Q 2400/50* (2013.01)

(58) Field of Classification Search
CPC ................................ B60Q 1/34; G03B 21/00
See application file for complete search history.

(56) References Cited

U.S. PATENT DOCUMENTS

| | | |
|---|---|---|
| 4,781,465 A | 11/1988 | Demachi et al. |
| 8,364,334 B2 | 1/2013 | Au et al. |
| 8,755,997 B2 | 6/2014 | Au et al. |
| 2005/0071082 A1 | 3/2005 | Ohmura et al. |
| 2005/0149251 A1 | 7/2005 | Donath et al. |
| 2007/0280503 A1* | 12/2007 | Kubota ............... B60Q 1/50 382/103 |
| 2009/0212934 A1* | 8/2009 | Shiraki ............... G08G 1/163 340/466 |
| 2011/0184605 A1* | 7/2011 | Neff ............... G05D 1/0231 701/25 |

(Continued)

FOREIGN PATENT DOCUMENTS

| | | |
|---|---|---|
| CN | 103318087 A | 9/2013 |
| EP | 1862989 A2 | 5/2007 |

(Continued)

OTHER PUBLICATIONS

Guan et al. "Using mobile laser scanning data for automated extraction of road markings." ISPRS Journal of Photogrammetry and Remote Sensing 87 (2014): pp. 93-107.

(Continued)

*Primary Examiner* — Sultan Chowdhury
*Assistant Examiner* — Danell L Owens
(74) *Attorney, Agent, or Firm* — Robert C. Bunker

(57) ABSTRACT

Embodiments of the present invention may relate to displaying road markings for a user without fading or becoming hidden. A road markings application may communicate with one or more devices to obtain road marking location information. The one or more devices may be attached to a vehicle, stationary device, or remote device. The road markings application may determine one or more locations for one or more projected road markings. A concentrated light source, such as a laser, attached to a vehicle may project road markings on a surface of a road. Projected road markings may change to accommodate vehicles of various sizes and/or to indicate potential obstacles on a road.

17 Claims, 7 Drawing Sheets

(56) References Cited

U.S. PATENT DOCUMENTS

| | | |
|---|---|---|
| 2012/0081544 A1 | 4/2012 | Wee |
| 2012/0283913 A1 | 11/2012 | Lee et al. |
| 2013/0335212 A1 | 12/2013 | Purks et al. |
| 2014/0267415 A1 | 9/2014 | Tang et al. |
| 2015/0032290 A1 | 1/2015 | Kitahama et al. |
| 2015/0339926 A1* | 11/2015 | Lange .................. G08G 1/167 |
| | | 340/902 |

FOREIGN PATENT DOCUMENTS

| | | |
|---|---|---|
| WO | 2004074582 A3 | 9/2004 |
| WO | 2012117542 A1 | 7/2012 |
| WO | 2013039273 A1 | 3/2013 |
| WO | 2013133752 A1 | 9/2013 |
| WO | 2014125248 A1 | 8/2014 |

OTHER PUBLICATIONS

Bertozzi et al. "Artificial Vision in Road Vehicles."Proceedings of the IEEE vol. 90, No. 7 (Jul. 2002): pp. 1258-1271.

Mell et al., "The NIST Definition of Cloud Computing", National Institute of Standards and Technology, Special Publication 800-145, Sep. 2011, pp. 1-7.

Chant, "Xfire Bike Safety Light Makes Your Own Bike Lane With Lasers", http://www.themarysue.com/xfire-bike-laser/, Sep. 26, 2012. 5 pages.

http://thexfire.com/products-p./lighting-system/bike-lane-safety-light, printed Sep. 15, 2015, 4 pages.

* cited by examiner

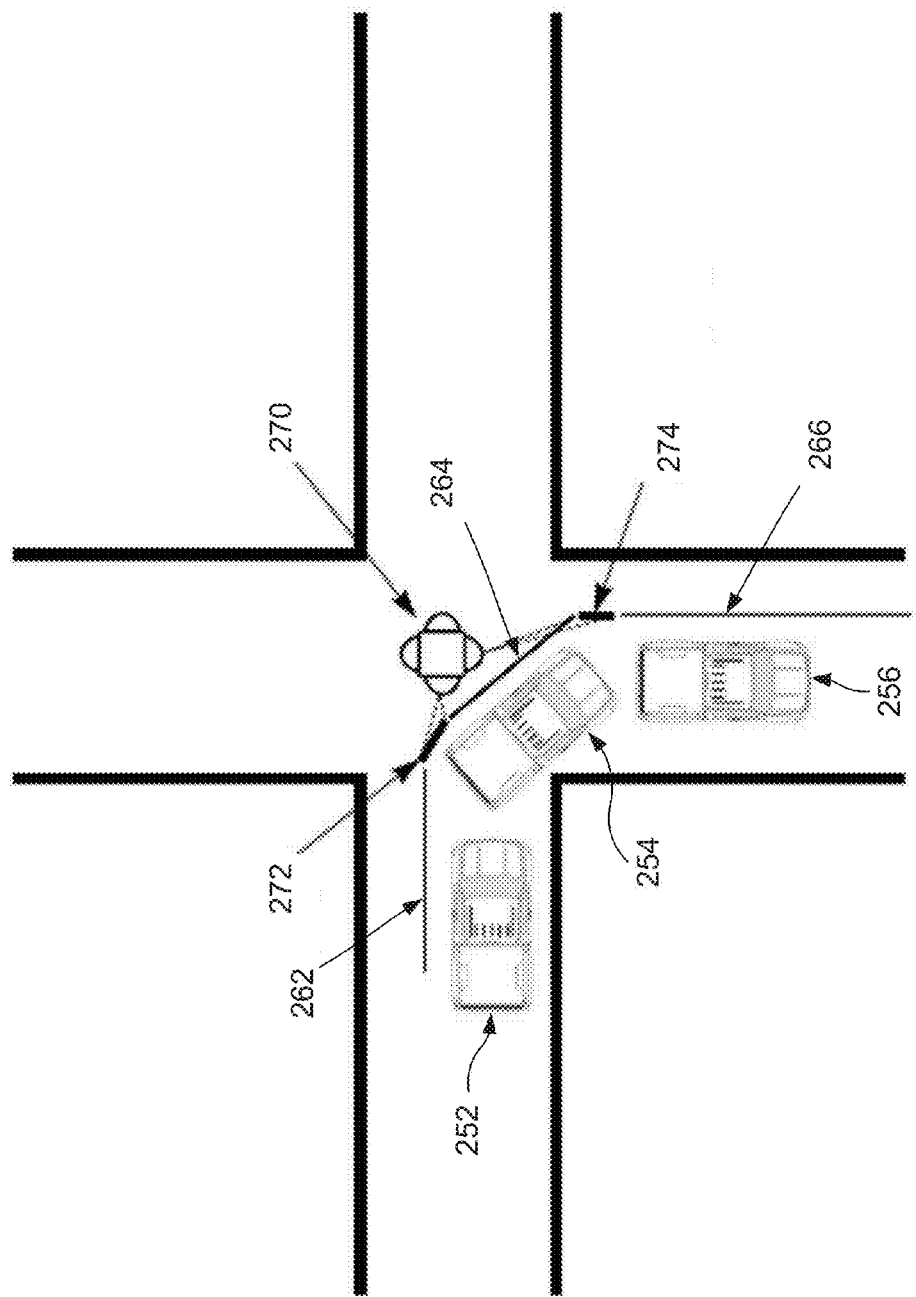

PROJECTED SURFACE MARKINGS

BACKGROUND

The present invention relates generally to the field of electronics, and more particularly to projecting markings on a surface.

Conventional road markings may be partitioned, divided, or indicate a direction of travel for a user. Conventional road markings may be painted on roads and sometimes utilize reflective materials. However, time, weather, and precipitation, can fade or hide road markings. When a user is unable to see road markings clearly, or at all, an unsafe driving environment may exist. Thus, a method to display road markings for a user that may not fade or become hidden is needed.

SUMMARY

Embodiments of the present invention disclose a method for projecting a marking on a surface. The method may comprise determining a first position of a first vehicle within a travelling environment. The method may comprise selecting a second position within the travelling environment for projecting the marking. The selection may be based on the first position and on the travelling environment. The method may comprise projecting a focused light beam, by a projector attached to the first vehicle, towards the second position. The projection may generate the marking on a surface at the second position. One or more steps of the method may be performed by one or more computers.

Embodiments of the present invention disclose a computer program product for displaying road markings. The computer program product may include a computer readable storage medium having program instructions embodied therewith. The computer readable storage medium is not a transitory signal per se. The program instructions may be executable by a computer to cause the computer to perform a method. The method may include a computer determining a first position of a first vehicle within a travelling environment. The method may include a computer selecting a second position within the travelling environment for projecting a marking. The selection may be based on the first position and on the travelling environment. The method may include a projector attached to the first vehicle projecting a focused light beam towards the second position. The projection may generate the marking on a surface at the second position.

Embodiments of the present invention disclose a computer system for displaying road markings. The computer system may include one or more computer processors, one or more computer-readable storage media, and program instructions stored on the computer-readable storage media for execution by at least one of the one or more processors. The program instructions may include instructions to determine, by a computer, a first position of a first vehicle within a travelling environment. The program instructions may include instructions to select, by a computer, a second position within the travelling environment for projecting a marking. The selection may be based on the first position and on the travelling environment. The program instructions may include instructions to project a focused light beam, by a projector attached to the first vehicle, towards the second position. The projection may generate the marking on a surface at the second position.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings.

FIG. 2B is a functional block diagram illustrating a road markings display environment, in accordance with an embodiment of the present invention.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Embodiments of the present invention may relate to projecting a marking on a surface, such as, for example, a road. Conventional road markings may fade or become hidden by obstacles, such as precipitation. When a user cannot see road markings clearly, or at all, an unsafe driving environment may exist. Thus, a method to display road markings for a user that may not fade or become hidden is needed.

Embodiments of the present invention may relate to displaying road markings for a user without fading or becoming hidden. Embodiments of the present invention may involve utilizing a light, such as a laser, attached to a first vehicle to display road markings. Other embodiments of the present invention may involve communicating with one or more other devices associated with one or more second vehicles to determine where road markings may be displayed.

In an embodiment, one or more automotive vehicles may be outfitted with internal, rear, front, roof, undercarriage, and/or side mounted laser projectors. These projectors may project light on a road surface in an intelligent way to form a center line, road edge boundary lines for the driver of the vehicle, and/or one or more lines for oncoming traffic. In an embodiment, the projections may be turned on and off based on conditions of the road. For example, if the road is dry, and there is no other traffic oncoming, the projections may be turned off. In another example, when oncoming traffic approaches the projections can be turned on. In another example, when the road is snow covered, the projections may be on for the duration of a drive time on snow covered roads. In an embodiment, projections may be used to temporarily widen or narrow lanes of a road. This may be useful in situations where vehicles are passing on a two lane road and projections may be shifted to perhaps use the shoulder temporarily to avoid a head on collision.

In another embodiment, laser projection may be used to display information to a driver ahead of a first driver on the road. This method may show information to a driver ahead, while permitting one or more drivers to focus on the road ahead. For example, when a danger to one or more users of a vehicle is determined, a message to "Slow down to 30 MPH" may be projected on a surface of a road. In another example, a projection of a cross hatch pattern may be used to show an area of the road that is covered with black ice.

In another embodiment, laser projections may mark a turning arc of a lane in an intersection. This may assist a driver in keeping a vehicle in an appropriate lane through a turn at an intersection. For example, multiple vehicles with side-mounted laser projection devices and stationary road mounted laser projectors may work in collaboration to provide a smooth projected curved turning arc for a vehicle to follow. Embodiments of the present invention will now be described in detail with reference to FIGS. 1-6.

Figure 1:
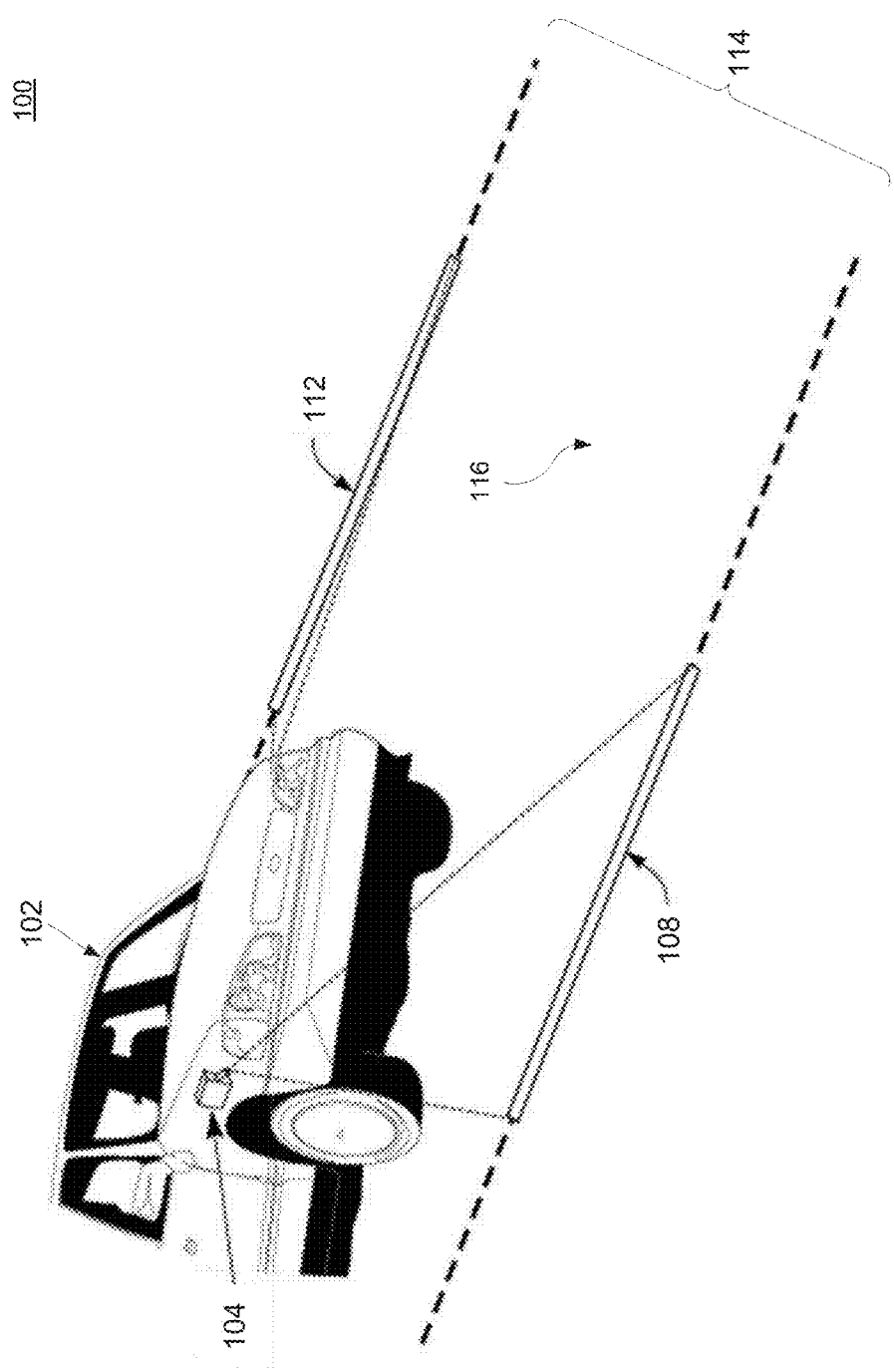
FIG. 1 is a functional block diagram illustrating a road markings display system, in accordance with an embodiment of the present invention.

FIG. 1 is a road markings display system 100, according to an aspect of the invention. In an exemplary embodiment, the road markings display system 100 may include a projector 104, a first projected line 108, and a second projected line 112.

The vehicle 102 may be any mobile machine capable of transporting people or cargo. For example, the vehicle 102 may be a car, truck, van, bus, wagon, tank, tractor, bulldozer, motorcycle, scooter, wheel chair, Segway® (Segway is a registered trademark of Segway Inc.), bicycle, snowmobile, train, tram, watercraft, ship, boat, jet ski, aircraft, airplane, helicopter, drone, spacecraft, etc. The vehicle 102 may include one or more propulsion devices, such as, for example, wheel, propeller, wing, continuous track, ski, or any combination thereof. In an embodiment, the vehicle 102 may include any object detection device known in the art, such as, for example, radar, sonar, camera, or any combination thereof.

In an embodiment, the vehicle 102 may include any communication device known in the art, such as, for example, a Bluetooth device, WiFi device, near-field communication (NFC) device, radio frequency device, or any combination thereof. In an embodiment the communication device in the vehicle 102 use a communication device to communicate via a network. The network may be any combination of connections and protocols that will support communications between a server and the vehicle 102. In an embodiment, the network may be the Internet, representing a worldwide collection of networks and gateways to support communications between devices connected to the Internet. The network may include, for example, wired, wireless or fiber optic connections. In other embodiments, the network may be implemented as an intranet, a local area network (LAN), a wide area network (WAN), or a combination thereof. The network may include wired connections, wireless connections, fiber optic connections, or a combination thereof. The vehicle 102 may include a computing node such as the computing node of FIG. 4.

The vehicle 102 may be operating on a surface 116. The surface 116 may be any surface or medium capable of supporting the vehicle 102, such as, for example, a roadway, waterway, airway, etc. A roadway may include, for example, pavement, gravel, soil, or any combination thereof. A roadway may also include a surface covered by water, snow, ice, or any combination thereof. For example, the surface 116 may be a highway covered by snow during or after a snowstorm. In another example, the surface 116 may be a highway covered by sand during or after a sandstorm. In another example, the surface 116 may be a ground surface, such as a hiking path or desert floor covered by ice or snow. A waterway may be any navigable route through a liquid medium, such as, for example, an ocean, lake, river, or any combination thereof. For example, the surface 116 may be an upper surface of a river. In another example, the surface 116 may be an upper surface of a river covered by ice.

The projector 104 may be any light emitting device capable of projecting a focused light beam. The projector 104 may include any type of light emitting device known in the art, for example, an electron-stimulated device, an incandescent lamp, an electroluminescent lamp, a gas discharge lamp, a laser device, or any combination thereof. In a preferred embodiment, the projector 104 may include one or more laser devices. The projector 104 may emit light with high temporal coherence and/or high spatial coherence. Light with a high spatial coherence may allow a light beam to stay narrow over a large distance. For example, light emitted from the projector 104 may be directed toward a particular point, line, or region on a surface (e.g. a road). By emitting light with a high spatial coherence, the projector 104 may generate a clearer projection on a surface. In an embodiment, the projector 104 may include any light bending device known in the art, such as, for example, a refraction device, a reflection device, a diffraction device, or any combination thereof. The projector 104 may include one or more refraction devices known in the art, such as, for example, a cylindrical lens, spherical lens, lenticular lens, or any combination thereof. In an embodiment, the one or more refraction devices may be used to focus a light beam. In preferred embodiment, the one or more refraction devices may be used to convert a point laser to a line laser. In an embodiment, the projector 104 may include a plurality of point lasers with a plurality of refraction devices to convert the plurality of point lasers to line lasers. The projector 104 may include one or more display devices, such as, for example, a digital light processing device, a liquid crystal on silicon device, a liquid-crystal display device, a cathode ray tube device, or any combination thereof. The projector 104 may include one or more motion control devices known in the art, such as, for example, a gyroscope, wheel and axle, lever, screw, hydraulic device, or any combination thereof. Motion control devices may be used to reorient one or more components of the projector 104. For example, motion control devices may be used to change an angle of a projection of a focused light beam as the vehicle 102 changes direction. The projector 104 may be on a side, front, rear, top, or bottom of the vehicle 102. One or more second projectors may also be on a side, front, rear, top, or bottom of the vehicle 102. In a preferred embodiment, the projector 104 may be on either side of the vehicle 102. By having a projector on each side of the vehicle 102 (e.g. a left side and a right side) a projected road marking may be generated on each side of the vehicle 102 (e.g. a first projected line 108 and a second projected line 112).

In an embodiment, the projector 104 may include any communication device known in the art, such as, for example, a Bluetooth device, WiFi device, near-field communication (NFC) device, radio frequency device, or any combination thereof. In an embodiment the communication device in the vehicle 102 use a communication device to communicate via a network. The network may be any combination of connections and protocols that will support communications between a server and the vehicle 102. In an embodiment, the network may be the Internet, representing a worldwide collection of networks and gateways to support communications between devices connected to the Internet. The network may include, for example, wired, wireless or fiber optic connections. In other embodiments, the network may be implemented as an intranet, a local area network (LAN), a wide area network (WAN), or a combination thereof. The network may include wired connections, wireless connections, fiber optic connections, or a combination thereof. The projector 104 may include a computing node such as the computing node of FIG. 4.

The vehicle 102 and/or the projector 104 may include a road markings application (not shown). The road markings application may be a program, function, or module of a computer program (not shown) executable by a processor of the road markings display system 100, or may be embodied as one or more connected computing systems. Road markings display system 100 may be implemented using a computing node such as the computing node of FIG. 4. The road markings application may determine a location of where one or more road markings should be projected onto the surface 116.

In an embodiment, the first projected line 108 and the second projected line 112 may be a display of an image on the surface 116. For example, if the surface 116 is a road, the first projected line 108 and the second projected line 112 may be one or more images on the road. In another example, if road marking exist (e.g. painted markings), the first projected line 108 and the second projected line 112 may be located in the same or different location as the existing road markings. Embodiments further describing when the first projected line 108 and the second projected line 112 may be located in the same or different location as the existing road markings are described below with respect to FIGS. 2A and 2B.

The first projected line 108 and the second projected line 112 may be generated by one or more projectors (e.g. the projector 104). In an embodiment, the projector 104 may be located on or near either side of the vehicle 102. For example, the projector 104 may be located on the right side (e.g. passenger's side) of the vehicle 102 and generate the first projected line 108 on a road on the right side of the vehicle 102. In another example, the projector 104 may be located on or near the left side (e.g. driver's side) of the vehicle 102 and generate the second projected line 112 on a road on the left side of the vehicle 102. In another example, the projector 104 may be located on the right side and the left side of the vehicle 102 and generate the first projected line 108 on a road on the right side of the vehicle 102 and the second projected line 112 on a road on the left side of the vehicle 102.

The first projected line 108 and the second projected line 112 may indicate a boundary on a right side and a left side of a lane 114. The lane 114 may have a consistent or a variable width. Embodiments further describing when the lane 114 may have a consistent or a variable width are described below with respect to FIGS. 2A and 2B. The projector 104 and the second projector may adjust a location of the first projected line 108 and the second projected line 112 in accordance with a width and location of the lane 114.

Figure 2A:
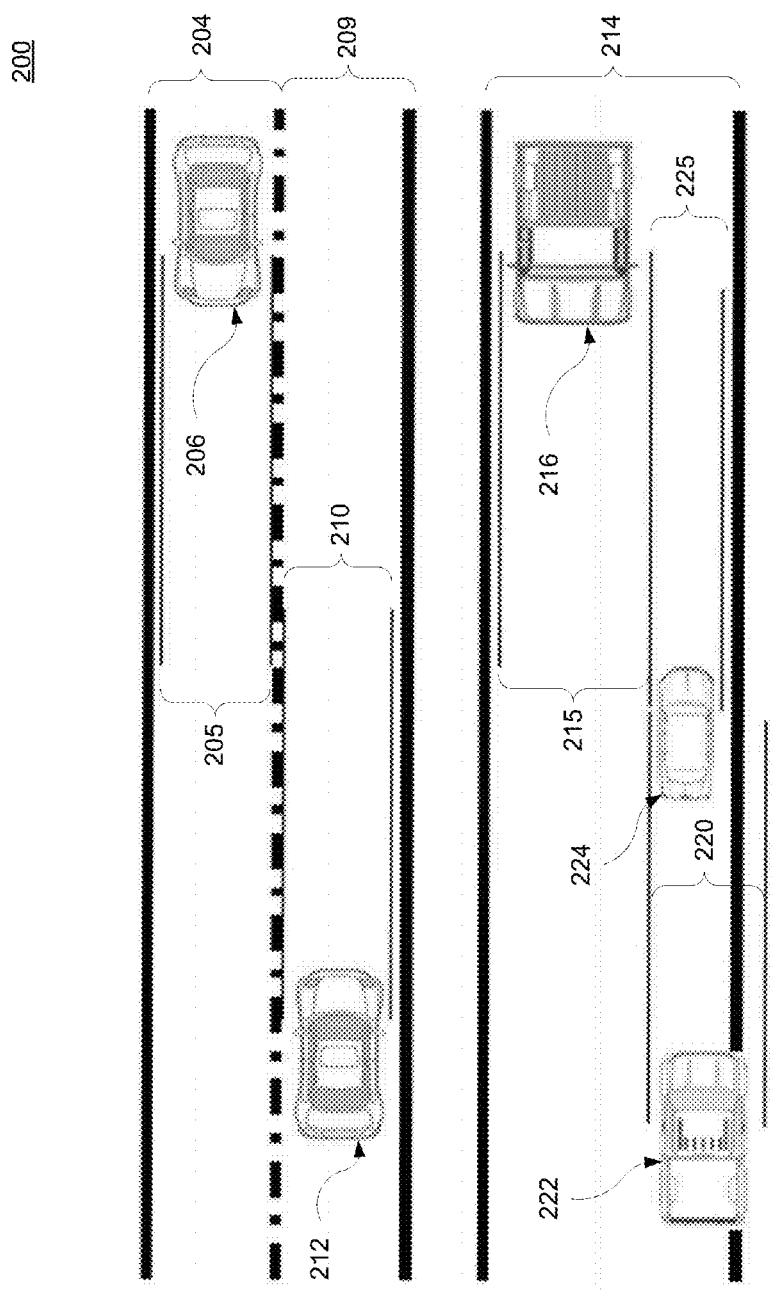
FIG. 2A is a functional block diagram illustrating a road markings display environment, in accordance with an embodiment of the present invention.

FIG. 2A is a travelling environment 200, according to an aspect of the invention. The travelling environment 200 may involve one or more vehicles traveling in opposite directions toward or away from one another. The travelling environment 200 may include a projected lane 205, a projected lane 210, a projected lane 215, a projected lane 220, a projected lane 225, a marked lane 204, a marked lane 209, a road 214, a car 206, a car 212, a wide car 216, a car 222, and a narrow car 224.

The marked lane 204 may include the car 206 and the projected lane 205. The marked lane 204 may be covered by a material (e.g. snow, sand, etc.) which may obstruct a view of one or more marks on a road. The car 206 may include the projector 104 (FIG. 1) on either side near a front portion of the car 206. The projector 104 may project the first projected line 108 (FIG. 1) and/or the second projected line 112 (FIG. 1) on a surface of the marked lane 204. The first projected line and the second projected line 112 may make up an outer boundary of the projected lane 205.

The marked lane 209 may include the car 212 and the projected lane 210. The marked lane 209 may be covered by a material (e.g. snow, sand, etc.) which may obstruct a view of one or more marks on a road. The car 212 may include the projector 104 (FIG. 1) on either side near a front portion of the car 212. The projector 104 may project the first projected line 108 (FIG. 1) and/or the second projected line 112 (FIG. 1) on a surface of the marked lane 204. The first projected line and the second projected line 112 may make up an outer boundary (i.e. a left side and a right side) of the projected lane 210.

In an embodiment, an outer boundary of the projected lane 205 and/or the projected lane 210 may be located at or near an outer boundary of the marked lane 204 and the marked lane 209, respectively. For example, the outer boundary of the projected lane 205 may be directly on top of one or more markings indicating an outer boundary of the marked lane 204. In another embodiment, an outer boundary of the projected lane 205 and/or the projected lane 210 may be located in a different location than an outer boundary of the marked lane 204 and/or the marked lane 209, respectively. For example, the projected lane 205 may be shifted to the left such that a left boundary is in an adjacent left lane (e.g. the marked lane 209) and a right boundary is to a left of an outer boundary. In another example, the projected lane 205 may have a smaller or larger width than the marked lane 204. In another example, the projected lane 205 may be shifted left and have a smaller width. In an embodiment, the car 206 may communicate with the car 212 to determine where to project the projected lane 205. In another embodiment, the car 206 may communicate with one or more stationary devices (e.g. a stop light) to determine where to project the projected lane 205. Further embodiments discussing communicating and/or collaborating with a stationary device is included with respect to FIG. 2B.

In an embodiment, when a traditional marking is difficult to see, the car 206 may generate the projected lane 205 and the car 212 may generate the projected lane 210. For example, poor weather conditions like rain or snow may make traditional markings (e.g. painted lines) on the marked lane 204 and the marked lane 209 difficult to see. In another example, weathering over time and/or poor maintenance may make traditional markings on the marked lane 204 and the marked lane 209 difficult to see. In another example, poor lighting conditions may make traditional markings on the marked lane 204 and the marked lane 209 difficult to see. In another example, a condition of a driver of the car 206, car 212, or another vehicle may make traditional markings on the marked lane 204 and the marked lane 209 difficult to see. In another embodiment, the car 206 may generate the projected lane 205 and the car 212 may generate the projected lane 210 to supplement visibility of existing markings. In another embodiment, the car 206 may generate the projected lane 205 and the car 212 may generate the projected lane 210 because no markings exist on the marked lane 204 and the marked lane 209.

In an embodiment, when a danger is detected, one or more road markings may be used to indicate the danger. For example, when a computing device determines that a high speed of the car 206 may result in a collision with another vehicle, a message to "Slow down to 30 MPH" may be projected on a surface of a road. In another example, when a computing device determines that a high rate of speed of the car 206 may result in a vehicle sliding at a sharp turn ahead, a message to "Slow down to 30 MPH" may be projected on a surface of a road. In another example, when a computing device determines that black ice is on a road or receives information regarding an area of black ice on the road, a projection of a cross hatch pattern may be used to show an area of the road that is covered with black ice. In another example, when a computing device determines that a pot hole is on a road or receives information regarding an area of a pot hole in a road, a projection of a cross hatch pattern may be used to show an area of a pot hole in a road.

The road 214 may include the wide car 216, the car 222, the narrow car 224, the projected lane 215, the projected lane 220, and the projected lane 225. The road 214 may include traditional markings (e.g. painted lines) or be unmarked (e.g. a dirt path). A surface of the road 214 may be covered by a material (e.g. snow and/or sand). The wide car 216 may generate the projected lane 215. The car 222 may generate the projected lane 220. The narrow car 224 may generate the projected lane 225. The car 222 and the narrow car 224 may be traveling in a same direction. The car 222 may be traveling behind the narrow car 224. The wide car 216 may be traveling in an opposite direction towards the car 222 and the narrow car 224. In an embodiment, the wide car 216, the car 222, and the narrow car 224 may collaborate to generate one or more continuous lines. In an embodiment, the projected lane 215, the projected lane 220, and the projected lane 225 may be shifted to accommodate a wide or narrow vehicle. In an embodiment, a color of a projected line may indicate a road condition (e.g. red for rough road and/or blue for snow).

In an embodiment, the wide car 216, the car 222, and the narrow car 224 may communicate with one another. For example, the wide car 216, the car 222, and the narrow car 224 may share information including, for example, a location, speed, acceleration, size, or any combination thereof. The wide car 216, the car 222, and the narrow car 224 may use this information to determine where one or more projected lines should be located. For example, the wide car 216 may provide information regarding its width and/or lane width requirements. The narrow car 224 may receive information from the wide car 216 and project the projected lane 225 in coordination with the wide car 216 such that enough space is provided for each vehicle. Specifically, the wide car 216 may project the projected lane 215 which is wider than the projected lane 225 so that each vehicle has adequate space on the road 214. A location of a projected line of the projected lane 225 may be shared with a projected line of the projected lane 215. In an embodiment, one or more lines of a projected lane may be shared such that the one or more lines may be continuous over a long distance. For example, the car 222 and the narrow car 224 may collaborate such that a left line of the projected lane 220 continues into a left line of the projected lane 225. The left line of the projected lane 220 continues into and the left line of the projected lane 225 may be, for example, a centerline in a road separating traffic traveling in opposite directions.

In an embodiment, when one or more vehicles collaborate a feature of a projected line may indicate that the one or more vehicles are collaborating. A feature may include, for example, a length, pattern, shape, brightness, color, or any combination thereof. For example, when the car 222 and the narrow car 224 collaborate in projecting a continuous left line, the continuous left line may be colored red. In another example, when the car 222 and the narrow car 224 collaborate in projecting a continuous left line, the continuous left line may be a bright double yellow line. In another example, when the car 222 and the narrow car 224 collaborate in projecting a continuous left line, the continuous left line may be a dashed blue line. In another embodiment, when one or more vehicles collaborate with a stationary device, a feature of a projected line may indicate that the one or more vehicles are collaborating with the stationary device. A stationary device may include may include any fixed machine capable of projecting a light on a road, such as, for example, a street light with a projector 104 (FIG. 1) attached. In an example, when the car 222 collaborates with a street light (not shown) to project a continuous line on a road, the continuous line may be a dashed green line.

FIG. 2B is a travelling environment 250, according to an aspect of the invention. The travelling environment 250 may involve one or more vehicles turning left or right at an intersection. The travelling environment 250 may include a rear car 252, a middle car 254, a front car 256, and a stationary device 270. In an embodiment, the rear car 252, the middle car 254, the front car 256, and the stationary device 270 may coordinate to project a continuous turning line and/or curved line (e.g. arc) through the intersection. For example, one or more lines may be curved and generate a smooth curved line through the intersection. In another example, one or more lines may be straight and adjacent to one another to generate a curved line through the intersection. For example, the rear car 252 may project a rear line 262, the middle car 254 may project a middle line 264, the front car 256 may project a front line 266, and the stationary device 270 may project a line 272 and a line 274. One or more lines or curves projected by one or more vehicles (e.g. the rear car 252) or one or more stationary devices (e.g. the stationary device 270) may be separated, connect, or overlap. For example, the rear line 262 may have a slight separation from the line 272. In another example, the rear line 262 may overlap the line 272.

In an embodiment, the one or more vehicles and the one or more stationary devices may coordinate to project a continuous curved line as the one or more vehicles travel through the intersection. The one or more lines used to project a turning lane through an intersection may be projected in one or more locations as each vehicle travels through the intersection. For example, when the middle car 254 is located near a middle of an intersection, the middle line 264 projected from the middle car 254 may be located near a middle of an intersection. As the middle car 254 completes a right turn, the middle line 264 may move from the middle of the intersection toward an outer region of the intersection closer to the road the middle car 254 is turning toward. For instance, the middle line 264 may move to a location previously illuminated by the front line 266. In addition, as the one or more vehicles move through the intersection, the one or more vehicles and the one or more stationary devices may coordinate by continuously updating a location for projecting one or more lines. For example, as the middle car 254 completes a right turn, the stationary device 270 may update a location for projecting the line 272 and the line 274. In another example, as the middle car 254 completes a right turn, the rear car 252 may update a location for projecting the rear line 262. In an embodiment, each vehicle and each stationary device located within or near an intersection may coordinate projecting a turning line through the intersection. For example, the front car 256, the middle car 254, the rear car 252, and the stationary device 270 may each communicate a location of a line each is projecting, a location of the device, and a speed and/or trajectory of the device. A determination may be made as to one or more projection locations associated with one or more times for projecting the line such that a continuous curved line may be projected through the intersection as each vehicle turns at the intersection.

Figure 3:
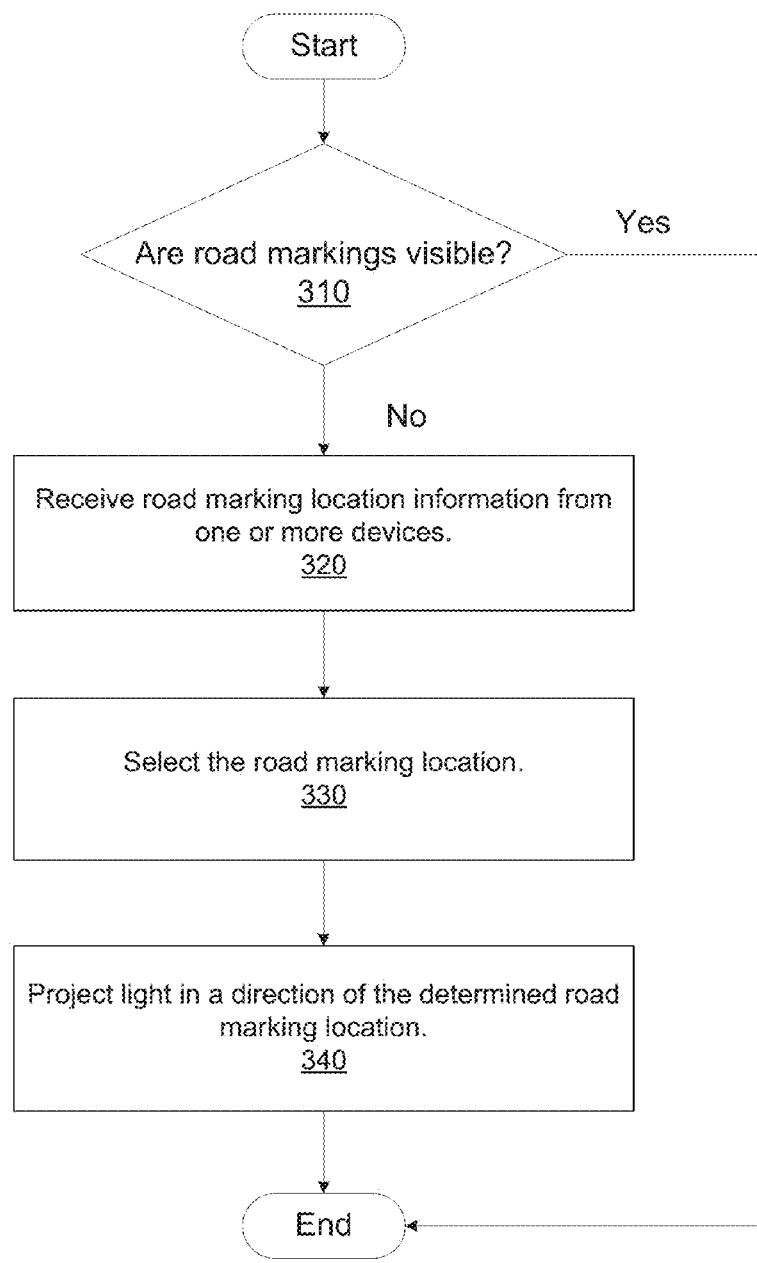
FIG. 3 is a flowchart depicting operational steps of a road markings display program, in accordance with an embodiment of the present invention.

FIG. 3 is a flowchart of a method 300 for displaying road markings, using the road markings display system 100 of FIG. 1, in accordance with an embodiment of the present invention. Steps of method 300 may be executed using a processor of a computer that encompasses, or is part of, the road markings display system 100, or another system. In an embodiment, a method 300 for displaying road markings may involve determining whether road markings are visible (decision 310), receiving marking location information from one or more devices (hereinafter "receiving location information 320" or "receive location information 320"), selecting a marking location (hereinafter "selecting road marking location 330" or "select road marking location 330"), and projecting light in a direction of the selected marking location (hereinafter "projecting 340").

Decision 310 may involve determining whether traditional road markings (e.g. painted lines) on a surface (e.g. a road) are visible to a driver and/or user of a vehicle. In an embodiment, decision 310 may be omitted so that subsequent steps (discussed below) are taken regardless of whether traditional road markings are visible or not. In an embodiment, the road markings application (FIG. 1) may perform decision 310 by providing instructions to a processor of a computing node. Decision 310 may be utilized such that subsequent steps (discussed below) are only taken when traditional road markings are not visible. For example, when traditional road markings are visible, the method 300 may end (decision 310, Yes). In another example, when traditional road markings are not visible, receiving location information may occur (decision 310, No). The road markings application may determine whether road markings are visible by, for example, receiving information from a camera or similar device. The camera or similar device may be attached, for example, to a vehicle and/or stationary device. The road markings application may analyze, for example, visual information provided by the camera or similar device to determine whether road markings are visible to a driver and/or user of a vehicle.

Receiving location information 320 may involve obtaining data from one or more devices. Receiving location information 320 may be performed by a computing device attached to a vehicle or a remote computing device (e.g. a cloud computing device). Location information may be obtained from one or more devices known in the art, such as, for example, a camera, radar, sonar, navigation device, compass, accelerometer, one or more devices on a second vehicle, or any combination thereof. For example, a first vehicle may have a communication device to send and/or receive location information to and/or from a second vehicle. Location information may be used for one or more purposes, such as, for example, determining a size, location, speed, and/or acceleration of one or more vehicles, determining a size, type, and/or location of one or more road markings (e.g. selecting road marking location 330), and/or determining a size, type, and/or location of a stationary device. For example, a computing device attached to a vehicle may receive information from a camera attached to a vehicle. In an example, one or more navigation devices may be attached to a vehicle which may identify a location of the vehicle which may be combined with one or more map databases to determine a location of the vehicle with respect to a travelling environment. The traveling environment of the vehicle may be a region within proximity of the vehicle and may include, for example, one or more second vehicles, one or more stationary devices, one or more surfaces (e.g. road, soil, water, etc), or any combination thereof. In another example, a cloud computing device may receive GPS data from one or more vehicles. In another example, a computing device attached to a vehicle may obtain data from a camera, navigation device, and an accelerator attached to one or more vehicles.

Selecting road marking location 330 may involve analyzing received location information. In an embodiment, the road marking application may determine that the road marking location for one or more projected road markings should be a same location as one or more traditional road markings on a road. In another embodiment, the road marking application may determine that the road marking location for one or more projected road markings should be in a different location than one or more traditional road markings on a road. In another embodiment, the road marking application may determine a road marking location on a surface where no traditional road markings exist. The road marking application may determine a location of a road marking by, for example, selecting a location of one or more traditional road markings, selecting a location based on a size of a road, selecting a location based a size of one or more vehicles, or any combination thereof. For example, the road marking application may determine that a road is wide enough to accommodate a wide vehicle and a narrow vehicle so a wide lane may be projected for the wide vehicle and a narrow lane may be projected for the narrow vehicle. In another example, the road marking application may determine that an obstruction (e.g. black ice, pot hole, obstacle, etc.) exists on the road and determine a location of the obstruction may be a location of a road marking (e.g. cross hatches) to accentuate the obstruction. In an embodiment, a selected location of a road marking may stay the same or change over time. For example, a selected road marking location for a stationary obstruction (e.g. a pot hole) may stay the same over time, and thus, a location of a projected road marking accentuating the obstruction may stay the same as well. In another example, a first narrow vehicle may pass a second wide vehicle where a selected road marking location of one or more road markings may shift over time to create a temporary narrow lane for the first narrow vehicle and a temporary wide lane for the wide vehicle.

Projecting 340 may involve emitting a concentrated light beam from a projector 104 (FIG. 1) to a surface 116 (FIG. 1). In an embodiment, the projector 104 may be attached to a vehicle and be projecting 340 a laser on a surface 116 of a road to form one or more projected road markings. In another embodiment, the projector 104 may be attached to a stationary device and be projecting 340 a laser on a surface 116 of a road to form one or more projected road markings. In another embodiment, the projector 104 may be attached to one or more vehicles and one or more stationary devices which may coordinate projecting 340 a laser one a surface 116 to form one or more projected road markings. Projected road markings may include, for example, lines, dots, dashes, text, images, or any combination thereof. For example, projected road markings may indicate an outer boundary of a lane of a road. In another example, when a danger to one or more users of a vehicle is determined, a message to "Slow down to 30 MPH" may be projected on a surface of a road. In another example, a projection of a cross hatch pattern may be used to show an area of the road that is covered with black ice.

Figure 4:
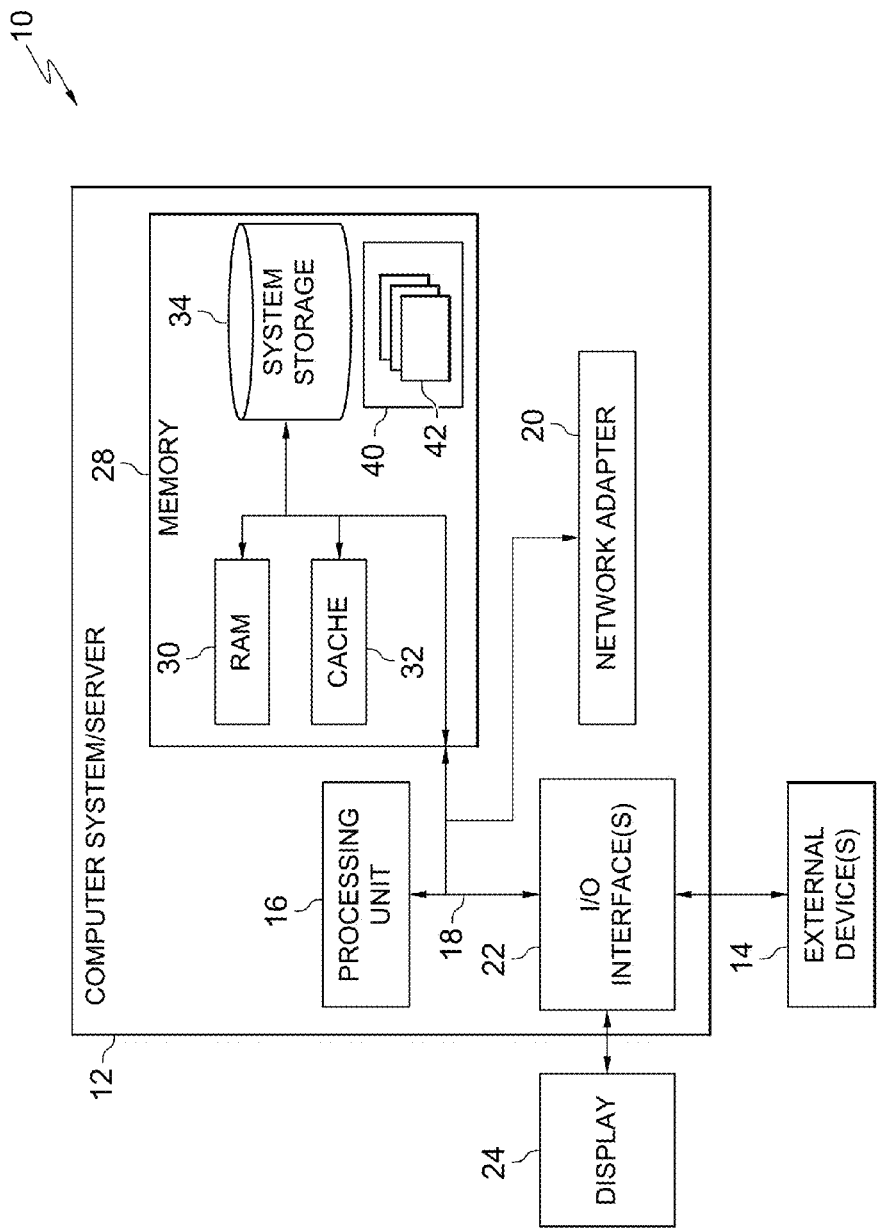
FIG. 4 depicts a block diagram of components of the proxy server computer executing the dynamic display program, in accordance with an embodiment of the present invention.

Referring now to FIG. 4, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
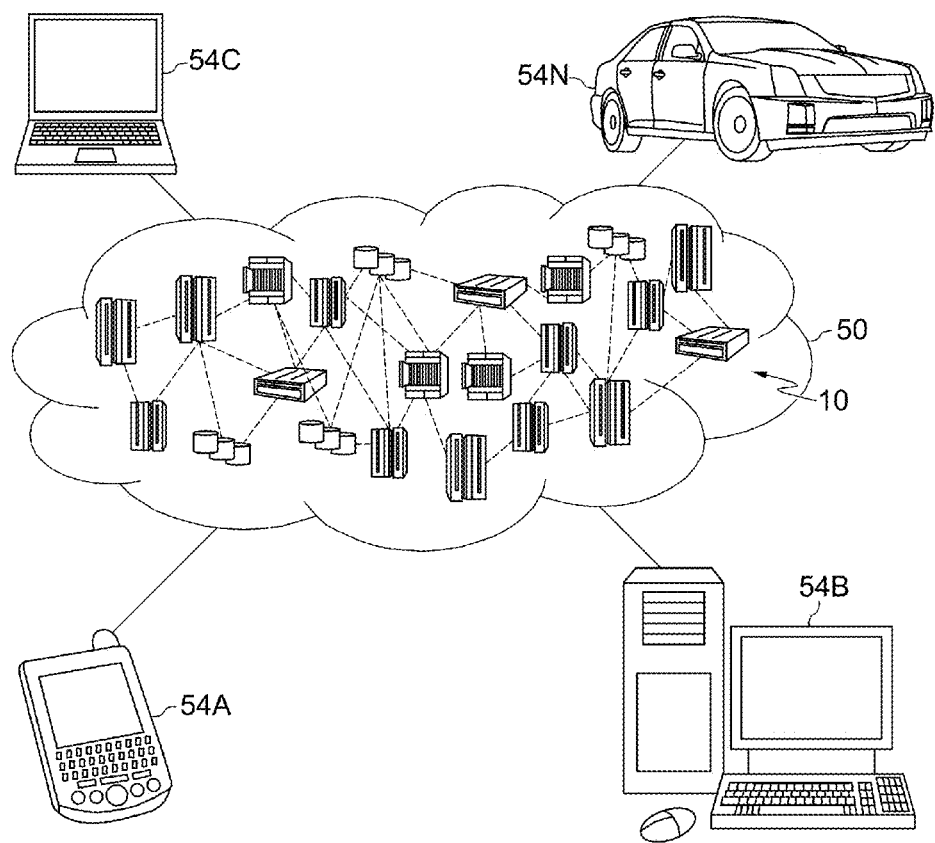
FIG. 5 depicts a cloud computing environment, in accordance with an embodiment of the present invention.

Referring now to FIG. 5, illustrative cloud computing environment 50 is depicted. As shown, cloud computing environment 50 comprises one or more computing nodes 10 with which local computing devices used by cloud consumers, such as, for example, personal digital assistant (PDA) or cellular telephone 54A, desktop computer 54B, laptop computer 54C, and/or automobile computer system 54N may communicate. Computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
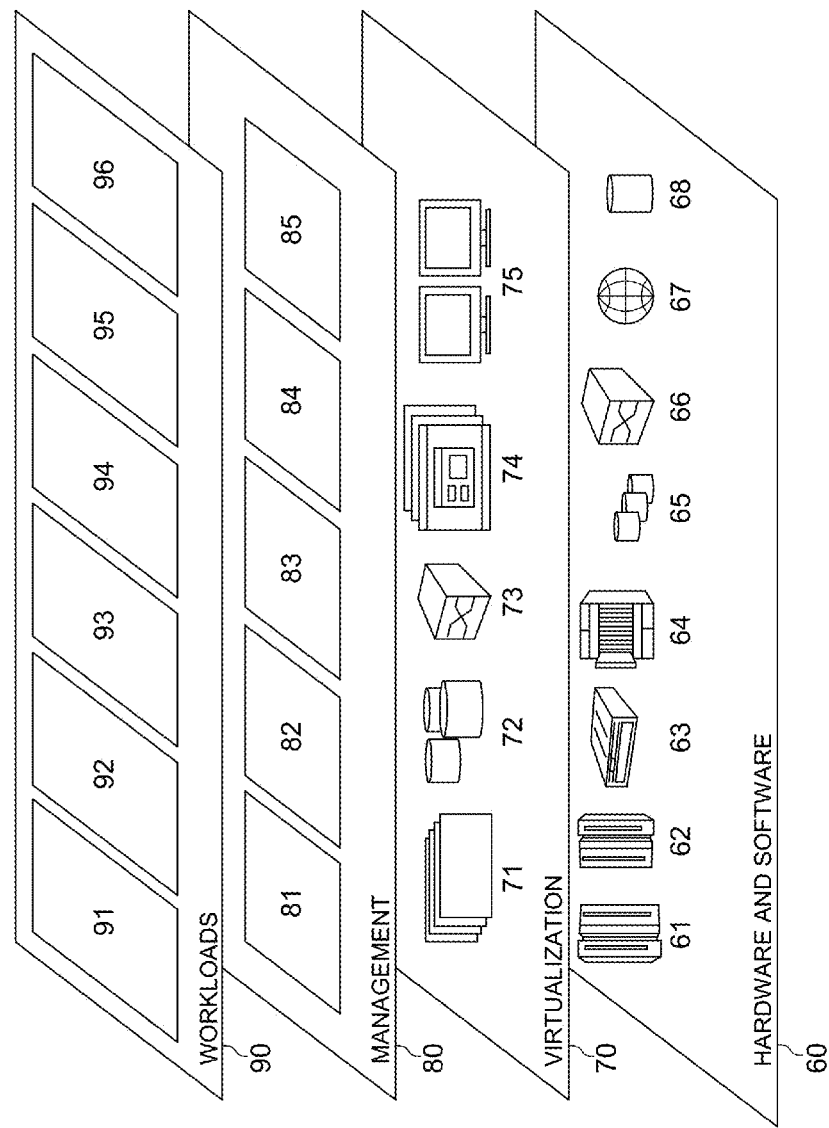
FIG. 6 depicts a set of functional abstraction layers provided by the cloud computing environment, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and road markings display system 96.

In a related embodiment, cloud migration services may be performed as part of management layer 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for projecting a marking on a surface, the method comprising:
   determining a first position of a first vehicle within a travelling environment;
   determining that an obstruction on the road exists, wherein the obstruction is associated with the travelling environment, and wherein the obstruction is a hazard on the surface of the road;
   selecting a second position within the travelling environment for projecting the marking, wherein the marking is projected on the hazard, wherein the selection is based on the determined obstruction, wherein selecting the second position comprises the first vehicle communicating with a second device, wherein communicating comprises communicating via a network;
   projecting a first focused light beam, by a first projector attached to a stationary device, towards the second position, wherein the second device is located on the stationary device; and
   projecting a second focused light beam, by a second projector attached to the first vehicle, towards the second position, whereby the first focused light beam and the second focused light beam projection generates the marking on the surface at the second position, wherein the second position is the hazard on the surface of the road, wherein one or more steps of the method are performed by one or more computers.

2. The method of claim 1, wherein determining the first position comprises receiving data from one or more navigation devices.

3. The method of claim 1, wherein selecting the second position within the travelling environment for projecting the marking comprises:
   selecting the second position in collaboration with one or more additional vehicles.

4. The method of claim 1, wherein selecting the second position within the travelling environment for projecting the marking comprises:
   selecting the second position in collaboration with one or more stationery devices.

5. The method of claim 1, wherein the surface in the second position comprises one or more of a pavement, gravel, soil, snow, ice, and water.

6. The method of claim 1, wherein the second position is adjusted based on a characteristic of the obstruction.

7. A computer program product for projecting a marking on a surface, the computer program product comprising a computer readable storage medium having program instructions embodied therewith, wherein a non-transitory computer readable medium having computer executable instructions stored thereon, the program instructions executable by a computer to cause the computer to perform a method comprising:
   determining, by a computer, a first position of a first vehicle within a travelling environment;
   determining that an obstruction on the road exists, wherein the obstruction is associated with the travelling environment, and wherein the obstruction is a hazard on the surface of the road;
   selecting, by a computer, a second position within the travelling environment for projecting the marking, wherein the marking is projected on the hazard, wherein the selection is based on the determined obstruction, wherein selecting the second position comprises the first vehicle communicating with a second device, wherein communicating comprises communicating via a network;
   projecting a first focused light beam, by a first projector attached to a stationary device, towards the second position, wherein the second device is located on the stationary device; and
   projecting a second focused light beam, by a second projector attached to the first vehicle, towards the second position, whereby the first focused light beam and the second focused light beam projection generates the marking on the surface at the second position, wherein the second position is the hazard on the surface of the road.

8. The computer program product of claim 7, wherein determining, by a computer, the first position comprises one or more navigation devices.

9. The computer program product of claim 7, wherein selecting, by a computer, the second position within the travelling environment for projecting the marking comprises:
selecting, by a computer, the second position in collaboration with one or more additional vehicles.

10. The computer program product of claim 7, wherein selecting, by a computer, the second position within the travelling environment for projecting the marking comprises:
selecting, by a computer, the second position in collaboration with one or more stationery devices.

11. The computer program product of claim 7, wherein the second position is adjusted based on a characteristic of the obstruction.

12. The computer program product of claim 7, wherein a color of the projection indicates a road condition.

13. A computer system for projecting a marking on a surface, the computer system comprising:
one or more computer processors;
one or more computer-readable storage media, wherein a non-transitory computer readable medium having computer executable instructions stored thereon;
program instructions stored on the computer-readable storage media for execution by at least one of the one or more processors, the program instructions comprising:
program instructions to determine, by a computer, a first position of a first vehicle within a travelling environment;
program instructions to determine, by a computer, that an obstruction on the road exists, wherein the obstruction is associated with the travelling environment, and wherein the obstruction is a hazard on the surface of the road;
program instructions to select, by a computer, a second position within the travelling environment for projecting the marking, wherein the marking is projected on the hazard, wherein the selection is based on the determined obstruction, wherein selecting the second position comprises the first vehicle communicating with a second device, wherein communicating comprises communicating via a network;
program instructions to project a first focused light beam, by a first projector attached to a stationary device, towards the second position, wherein the second device is located on the stationary device; and
program instructions to project a second focused light beam, by a second projector attached to the first vehicle, towards the second position, whereby the first focused light beam and the second focused light beam projection generates the marking on the surface at the second position, wherein the second position is the hazard on the surface of the road.

14. The system of claim 13, wherein program instructions to determine comprise one or more navigation devices.

15. The system of claim 13, wherein program instructions to select, by a computer, the second position within the travelling environment for projecting the marking comprises:
program instructions to select, by a computer, the second position in collaboration with one or more additional vehicles.

16. The system of claim 13, wherein program instructions to select, by a computer, the second position within the travelling environment for projecting the marking comprises:
program instructions to select, by a computer, the second position in collaboration with one or more stationery devices.

17. The system of claim 13, wherein the second position of the marking is adjusted based on a characteristic of the obstruction.

\* \* \* \* \*